A. RYCKMAN.
GEARING.
APPLICATION FILED SEPT. 13, 1912.
1,139,808.
Patented May 18, 1915.
3 SHEETS—SHEET 1.
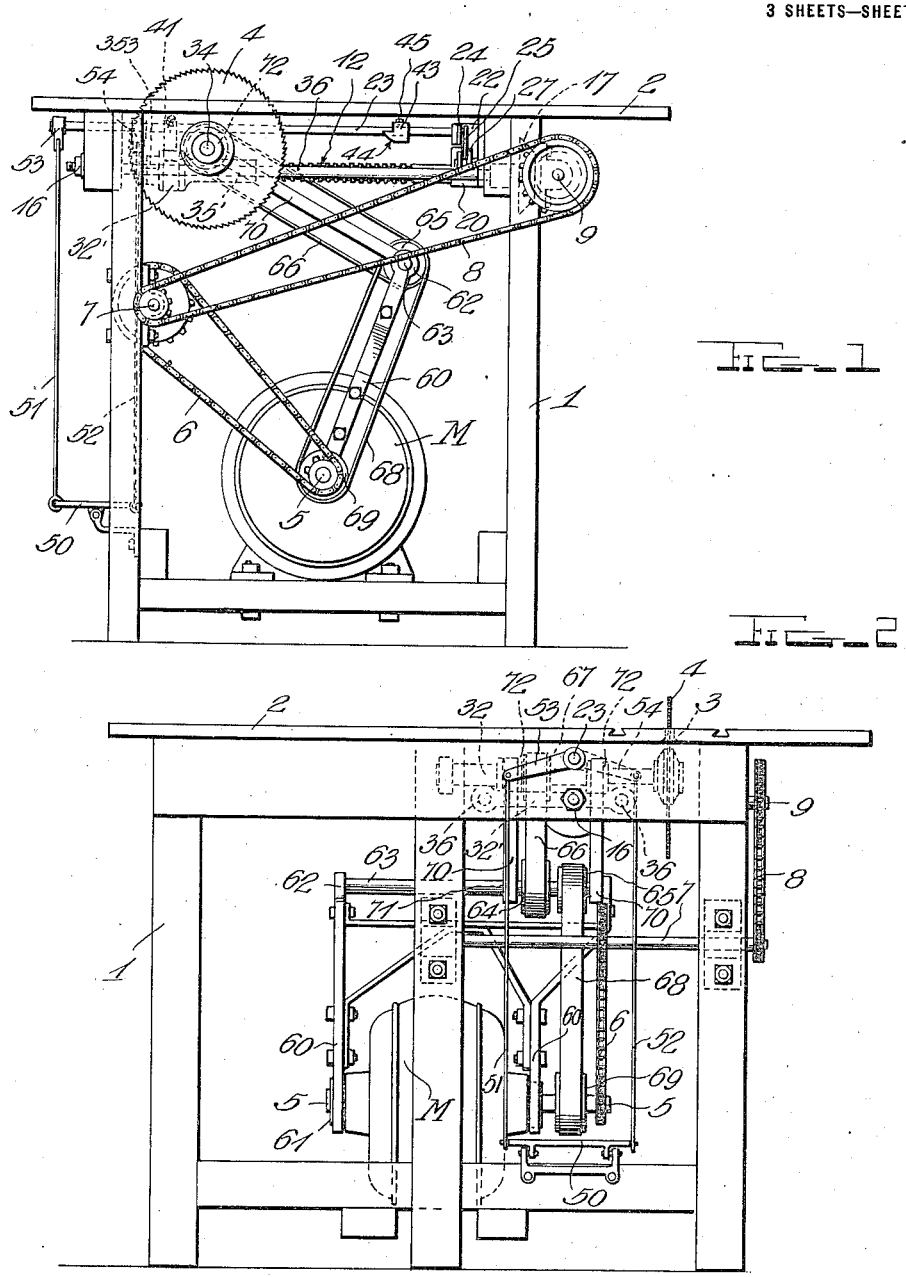
Inventor
A. Ryckman
By H. B. Willson & Co.
Attorneys
Witnesses A. RYCKMAN.
GEARING.
APPLICATION FILED SEPT. 13, 1912.
1,139,808.
Patented May 18, 1915.
3 SHEETS—SHEET 2.
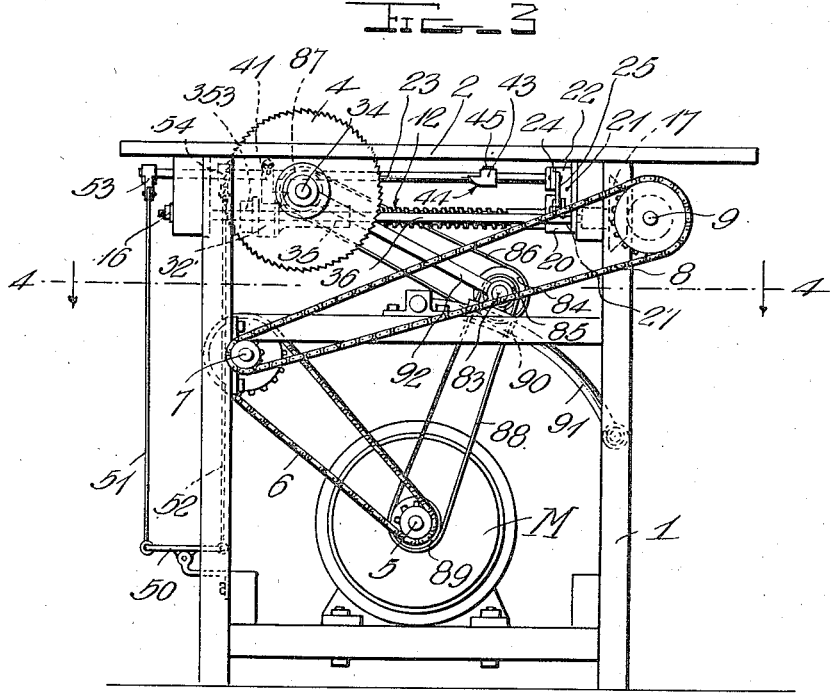
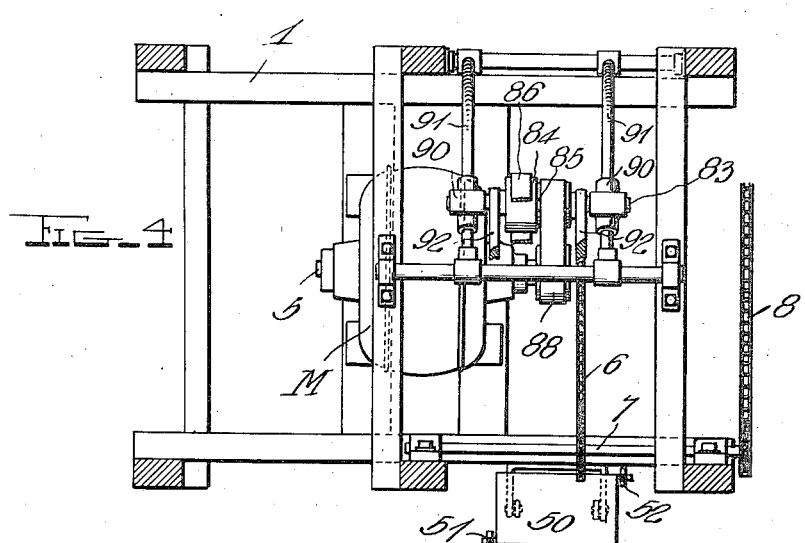
Witnesses
Inventor
A. Ryckman
By H. B. Willson & Co.
Attorneys

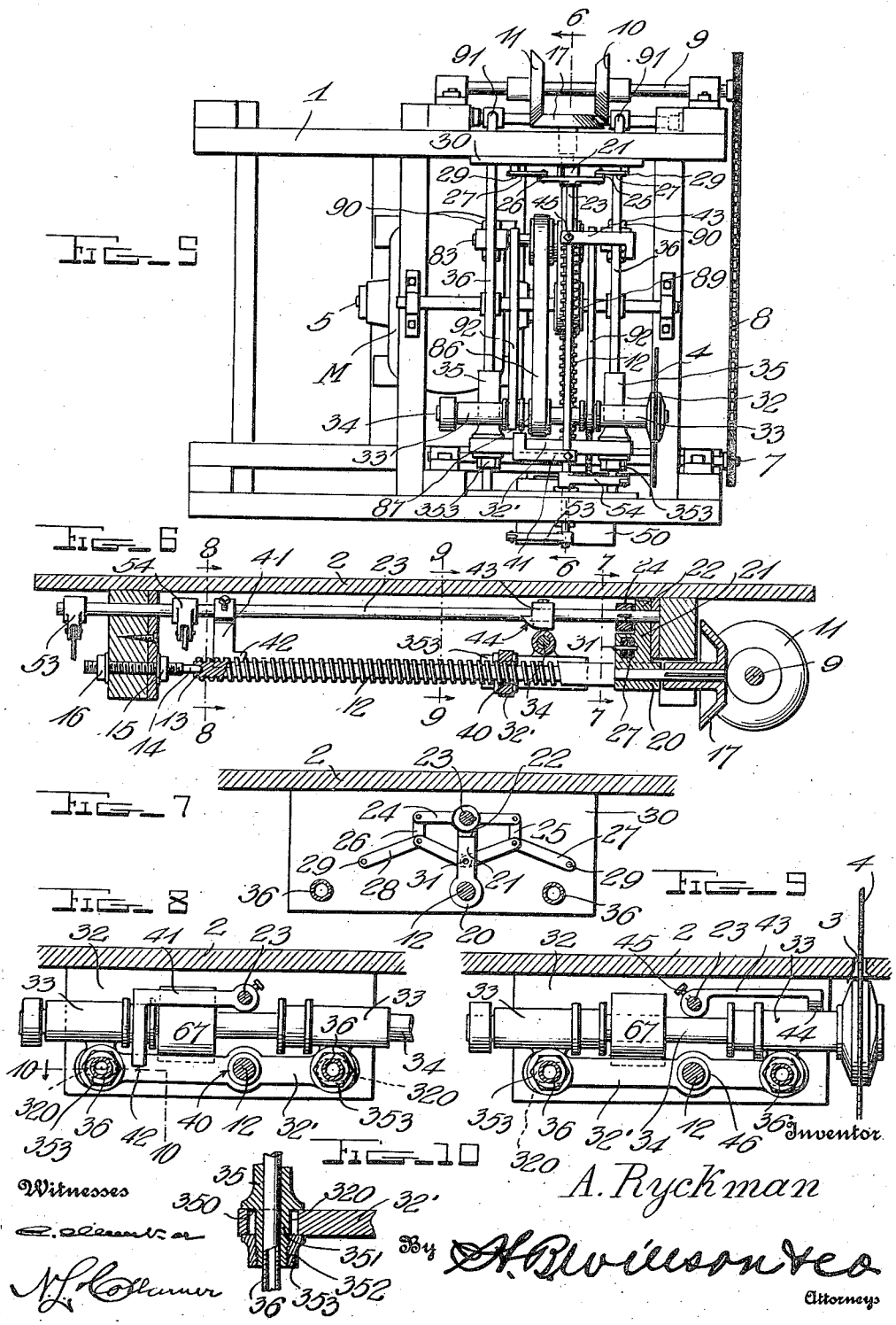

UNITED STATES PATENT OFFICE.

ANDREW RYCKMAN, OF WAUKEGAN, ILLINOIS.

GEARING.

1,139,808.  Specification of Letters Patent.  Patented May 18, 1915.

Application filed September 13, 1912. Serial No. 720,221.

*To all whom it may concern:*

Be it known that I, ANDREW RYCKMAN, a citizen of the United States, residing at Waukegan, in the county of Lake and State of Illinois, have invented certain new and useful Improvements in Gearing; and I do declare the following to be a full, clear, and exact description of the invention, such as will enable others skilled in the art to which it appertains to make and use the same.

This invention relates to gearing, more particularly gearing for circular sawing machines and one of the objects of my invention is to provide improved means for automatically moving a saw carriage forward through the work when its movement is once begun, and rearward across the table after its work has been completed. I also provide means for bringing a saw carriage to rest at the rear of the table and additional manually operated means for moving the saw carriage in either direction at any time.

While I have illustrated my invention in combination with a particular circular sawing machine construction it will be remembered that my present invention has to do with the gearing *per se*.

In carrying out these objects, I make use of a construction hereinafter more fully described and claimed, and as shown in the drawings wherein—

Figure 1 is a side elevation, and Fig. 2 a front elevation of my improved machine in its preferred form; Fig. 3 is a side elevation, and Fig. 4 a section on the line 4—4 of Fig. 3, showing a slightly different form of my improved machine; Fig. 5 is a plan view of the machine with the table removed so as to show the parts beneath; Fig. 6 is an enlarged section on the line 6—6 of Fig. 5, and Fig. 7 a cross section on the line 7—7 of Fig. 6; Figs. 8 and 9 are cross sections on the lines 8—8 and 9—9 respectively of Fig. 6. Fig. 10 is an enlarged horizontal section, taken on about the line 10—10 of Fig. 7, showing more particularly the loose connection between the front bar of the carriage and one of the sleeves of the latter.

The frame 1 of this machine may be of wood or metal and carries a table 2 slotted at 3 so that the circular saw 4 may project therethrough, and the material to be sawed is brought to the machine and laid across the table at any desired angle, and then the saw carriage caused to move forward so that the saw will pass through the material and cut it as desired. Obviously this avoids the necessity for a carriage on which the work can be mounted and moved over the table past the saw, as employed where the latter is fixed and the work travels; and the result is that the entire machine can be built on such a small scale that it will be portable—weighing perhaps between two hundred and three hundred pounds only. Such being a fact, it can be moved bodily to the place where the sawing is to be done (as, for instance, to a house being built) where it can be set up within small space, and the work to be done is brought to it and carried away as soon as it is finished. Therefore the entire machine can be run by one or two operators, and when the work on this house is finished it can be moved along to the next one.

In the accompanying drawings I have shown a power shaft 5 driven by an electric motor M which might well be mounted on the framework as shown, but it is obviously possible to connect this shaft with some other source of power if the same be present at the point where the work is to be done. This and other details may be safely left to the manufacturer who will build the machines to meet the demand for them, and therefore I do not wish to be limited to the precise details of construction hereinafter described, nor to the sizes, shapes and proportion of parts.

The power shaft is shown as connected by belting 6 to a pulley on a countershaft 7 and another pulley on this shaft by belting 9 to what I will call the "feed shaft" 9 extending across the rear end of the frame 1, and this shaft carries two beveled friction pulleys 10 and 11 whose smaller ends are disposed toward each other as seen in Fig. 5.

The numeral 12 designates a feed screw having a socket 13 in its front end engaged by the tip of a step bearing 14 which is rendered adjustable through the front cross bar of the frame by means of nuts 15 and 16 at opposite sides of said cross bar as best seen in Fig. 6; and the rear end of this feed screw 12 carries a beveled fiber wheel 17 of a size and disposed to stand between said friction pulleys 10 and 11 without contacting with either, although when the rear end of this screw is swung to one side or the other the fiber wheel will be thrown into contact with the beveled face of one pulley or the other and the screw thereby rotated in one direction or the other as will be clearly understood. I emphasize the point that the lateral movement of this screw necessary to throw it into contact with either pulley or out of contact with both, is extremely slight, and much less than would be necessary if the pulleys had teeth no matter how small, besides which the friction drive thus imparted to the screw 12 makes it possible to stop and to start its rotation without the jerk which would be unavoidable if gears were employed. Yet it becomes necessary when friction pulleys are employed to provide means for holding the driven pulley or wheel reliably in contact with the driving pulley after the shift has been made, and therefore I make use of the following detail of construction best illustrated in Fig. 7.

The rear end of the feed screw 12 is journaled in a bearing 20 at the lower end of a swinging box 21 whose upper end has an eye 22 loosely mounted on a rock shaft or "shifter rod" 23 which is turned in one direction or the other from time to time by means yet to be described. Fixed on said rod is a cross bar 24 to whose extremities are pivoted hanging links 25 and 26, the former pivoted at its lower end to the intermediate pivot of a short toggle lever 27, and the link 26 pivoted at its lower end to the intermediate pivot of a short toggle lever 28. Said toggles have their outermost extremities pivoted at 29 to a plate 30 carried by the framework, and their innermost extremities pivoted at 31 to the box 21 between its ends. The result is that when the shifter rod 23 is turned in either direction, one end of the cross bar 24 rises and the other end descends, one toggle is opened and the other is closed to a degree, and the opening or expanding toggle pushes on the box 21 at the point 31 and swings it around its upper end so that the bearing 20 at its lower end moves a trifle to one side or the other and the screw 12 is carried one way or the other. This throws its fiber wheel 17 into contact with one pulley 10 or the other 11, and the straightening out of the toggle holds it forcibly in such contact. When the shifter rod 23 is turned to restore the parts to the position shown in Fig. 7, the feed screw 12 has its fiber wheel 17 moved to a strictly neutral position between the friction pulleys 10 and 11, so that the screw is not rotated in either direction. The parts are considerably exaggerated in Fig. 7 to show the action of the two toggles and the swinging box 21, yet it will be obvious that I employ the toggles to hold the screw in either lateral extreme position to which it is moved by this mechanism and so that reliable contact will be made between the driving pulley 10 or 11 and the driven pulley or wheel 17.

The saw carriage 32 has bearings 33 for the mandrel 34 carrying the saw 4, and also has parallel sleeves 35 sliding on guide rods 36 mounted in the frame at opposite sides of and parallel with the feed screw 12. The bearings or boxes 33 are fast on the sleeves 35 and at right angles thereto, so that when the sleeves slide upon the guide rods 36 which they fit quite closely the mandrel 34 is retained ever in a proper position straight across the table and the saw blade 4 is moved straight along its slot 3 so that it will not bind therein. The carriage and its parts are moved back and forth beneath the top 2 by the rotation of the feed screw 12 in one direction or the other, because said screw engages a threaded opening 40 in one bar 32' of the carriage. The forward end of each sleeve 35 is shouldered as at 350, forward of which it is reduced as at 351 and externally threaded as at 352, and onto these threads screws a nut 353. Each end of the bar 32' has formed in it a slightly elongated hole 320 loosely engaging the reduced portion 351 between the shoulder 350 and the nut 353; and the result of this construction is that the bar 32' may move laterally just a trifle within the entire carriage 32, so that the bar may swing from side to side with the feed screw 12 while the carriage moves back and forth in a straight line. The latter travels beneath the shifter 23 as seen in Fig. 6, and on said shifter near its front end is secured an L-shaped trip member 41 projecting to one side and having a beveled lower end 42 adapted to be struck by the carriage as seen in Fig. 8, and another L-shaped trip member 43 projecting to the other side and having a similar beveled lower end 44 adapted to be struck by the carriage or one of the bearings for the mandrel when the carriage moves in the other direction, as seen in Fig. 9. However, I would make the active face 44 of the last-named trip somewhat shorter than the face 42 of the first-named trip, with the following results: As the carriage moves forward and strikes the trip 41, the shifter turns so that the fiber wheel 17 is thrown into positive contact with the proper pulley to cause the saw carriage to move to the rear. On the other hand, when the trip 43 is actuated automatically as the carriage reaches its rearmost position, it turns the shifter 23 only sufficiently to throw the fiber wheel 17 to a neutral position between the pulleys 10 and 11, and therefore the carriage comes to rest with its saw at the rear end of the table. The member 44 may therefore be called a "half trip" because while it does actuate the tripping mechanism, it restores the parts only to the position shown in Fig. 7 and does not start the carriage forward. However, by adjusting the set screw 45 shown in Fig. 9, the tip 44 of this member could be set a little lower so that it would perform its full function of checking the rearward movement of the carriage and starting it forward again.

The manually controlled means for actuating the shifter comprises a treadle 50 pivoted between its front and rear edges to the framework 1 and having rods 51 and 52 rising from it to arms 53 and 54 projecting rigidly and in opposite directions from the shifter 23; and when the operator places his foot on this treadle and bears down with his toe he turns the shifter in one direction, whereas when he bears down with his heel he may turn it in the opposite direction. The manual control is useful at any time for checking the movement of the saw carriage in either direction and bringing it to rest, or causing it to travel instantly in the opposite direction; and it is especially useful in connection with a half-trip as above described, because after the saw has traveled forward over the table and performed a piece of work and then automatically returned to its position at the rear thereof and comes to rest, the operator by means of the treadle may start the saw forward again as soon as he is ready for it to perform another piece of work. As above suggested, however, if the half-trip is set it becomes a full trip, and the treadle will not be necessarily called into action although its possibilities for use are still present.

My preferred means for driving the saw mandrel from the power shaft is best illustrated on sheet 1 of the drawings. Herein I show a hinged framework comprising upper and lower members which may be made of tubing or of rods or strap iron, and whose essential characteristics are as follows: The lower member 60 is journaled on the turned end of the motor-casing at 61, out of contact with the power shaft 5, around which it may swing as a center as seen in Fig. 1, and its upper end has journals or bearings 62 for a counter shaft 63 having two pulleys 64 and 65. The former of these pulleys is belted as at 66 to a pulley 67 which is fast on the saw mandrel, while the pulley 65 in the present instance is belted as at 68 to a drive pulley 69 fast on the power shaft 5. The uppermost of said members, numbered 70, has the lower ends of its arms journaled as at 71 on the countershaft 63, and the upper ends of its arms journaled as at 72 or around the bearings for the saw mandrel. Thus it will be seen that the countershaft forms in effect a pintle between the two members of this framework, the outer or lower end of the lowermost member being mounted around the power shaft 5, and the outer or upper end of the uppermost member being mounted around the saw mandrel 4 while the intermediate pivot or countershaft is a movable member constituting the knuckle of the hinge and swinging in an arc around the power shaft as the mandrel travels horizontally to the rear and to the front in the movements of the saw carriage as described above.

Another means for connecting the power shaft with the saw mandrel is shown on sheet 2 of the drawings. Herein the countershaft 83 has the pulleys 84 and 85 belted respectively as at 86 and 88 to pulleys 87 and 89 on the saw mandrel and the power shaft, but the extremities of said countershaft are mounted in boxes 90 which are slidable on curved tracks 91 struck on the arc of a circle around the power shaft as a center, while arms 92 connect the countershaft with the saw mandrel so as to hold these parts properly spaced. With the preferred construction first described above, the members of the hinged frame are useful for keeping the belts tight; with the construction last described above, the arms 92 are the equivalents of the uppermost member and therefore keep the belt 86 tight, and the belt 88 is kept tight by reason of the fact that the boxes 90 travel on tracks 91 which are always the same distance from the center of the power shaft 5. I might here say that although I have shown said shaft belted through a countershaft 7 to the feed shaft 9, the connection between these elements may be direct and might, in fact, be other than belting, so long as the rapidly rotating power shaft turns the feed shaft 9 rather slowly, as it is understood that the screw 12 must not rotate in either direction too rapidly. While I have considered it necessary to illustrate these two means only for driving the saw arbor from the power shaft and yet permitting the saw carriage to be reciprocated horizontally within the frame 1, other means might be employed without departing from the spirit of my invention.

The use of a machine of this kind is too well understood to need repetition here. I will call attention only to the fact that one of the important features of the invention is the specific means for automatically actuating the shifter 23 at both extremes of the movement of the saw carriage, by a full trip at the front of the frame so that the saw carriage immediately begins to return to the rear and by a "half trip" at the rear so that when the saw carriage reaches that point it comes to rest. Coöperating with this detail is the foot trip mechanism, perhaps old in itself, but which is employed in conjunction with the half trip so that the operator may start the carriage forward again as soon as he has placed a new piece of work in position to be sawed.

I have not considered it necessary to illustrate any devices for holding the work on the table, either at right angles or at any other angle to the line of the saw, as these form no part of the present invention.

What is claimed as new is:

1. In combination a fixed support, a reciprocating element movable thereon, a feed screw engaging a threaded opening in said reciprocating element, a beveled wheel on said screw, spaced beveled friction wheels adjacent said first wheel, a rocking shifter extending across the support, stops thereon struck by the reciprocating element at the extreme of its movement in either direction, a cross-bar fast on the shifter, two toggle levers pivoted at their outer extremes to a fixed support and having their inner extremes pivotally connected with said screw, and connections between said cross-bar and the intermediate pivots of said toggles whereby the latter are actuated oppositely to each other, for the purpose set forth.

2. In combination a fixed support, a reciprocating element movable thereon, a feed screw engaging a threaded opening in said reciprocating element, a beveled wheel on said screw, spaced beveled friction wheels adjacent said first wheel, a rocking shifter extending across the support, stops thereon struck by the reciprocating element at the extreme of its movement in either direction, a cross-bar fast on the shifter, two toggle levers pivoted at their outer extremes to the fixed support and having their inner extremes pivotally connected with said screw, and links pivoted at their upper ends to opposite extremities of said cross-bar and at their lower ends to the intermediate pivots of said toggles for actuating the latter, for the purpose set forth.

3. The combination with a support and reciprocating element movable thereon, of a feed screw engaging a threaded opening in said reciprocating element, a beveled wheel on said screw, spaced beveled friction wheels adjacent said first wheel, a rocking shifter extending across the support, stops thereon struck by the reciprocating element at the extremes of its movement in either direction, a cross-bar fast on said shifter, a swinging box pivoted on the shifter and having a bearing at its lower end in which said screw is journaled, two toggle levers whose outer extremes are pivoted to a fixed support and whose inner extremes are pivoted to said box, and links connecting the opposite extremes of said cross-bar with the intermediate pivots of said toggles for the purpose set forth.

4. The combination with a slotted support carrying parallel guides, of a carriage having sleeves moving on said guides and bearings fast on the sleeves, a feed screw disposed between said guides, a beveled wheel on said screw, spaced beveled friction wheels adjacent said first wheel, and means for moving the latter into contact with either of said friction wheels or to a neutral position between them, of a bar in the carriage having a threaded opening engaged by said screw, and lost-motion connections between the extremities of said bar and said sleeves.

5. The combination with a support having parallel guides, of a carriage having sleeves moving on said guides, a feed screw between said guides, a wheel on said screw, spaced friction wheels adjacent said first wheel, means for moving the latter into contact with either of said friction wheels or to a neutral position between them, and a bar having a threaded opening with which said screw engages and elongated openings near its ends, said sleeves having portions extending into said elongated openings and thus having lost-motion connection with said bar.

6. The combination with parallel guides, a carriage having sleeves movable thereon, a feed screw disposed between said guides, means for turning it in either direction, a bar having a threaded opening with which said screw engages and elongated openings near its ends, the front ends of said sleeves being shouldered and then reduced and threaded and projecting loosely through the elongated openings in said bar, and nuts on their threaded extremities forward of the bar and permitting the latter to have a slight lateral motion with respect to the sleeves, for the purpose set forth.

7. In combination a support, an element carried by the support and arranged to be reciprocated relatively thereto, a screw operatively engaging the reciprocating element, a wheel fixed upon said screw, spaced driving wheels located on diametrically opposite sides of said first wheel and normally out of engagement therewith, means for moving said first wheel into engagement with one of said driving wheels to drive the reciprocating element in one direction and means operated by the reciprocating element arranged to shift the first wheel with respect to its associated driving wheels.

8. The combination with a support, a carriage mounted on said support and arranged to reciprocate relatively thereto, a feed screw, a wheel on said screw, spaced friction wheels adjacent said first wheel, means for moving the latter into contact with either one of said friction wheels or to a neutral position between them, and a bar having a threaded opening in which said screw engages, said bar having lost motion connection with the reciprocating element.

9. In combination a support, an element carried by the support and arranged to be reciprocated relatively thereto, a shaft arranged when operated to cause reciprocation of said element, a wheel fixed upon said shaft, spaced driving wheels located on diametrically opposite sides of said first wheel and normally out of engagement therewith, means for moving said first wheel into engagement with one of said driving wheels to drive the reciprocating element in one direction and means operated by the reciprocating element arranged to shift the first wheel with respect to its associated driving wheels.

In testimony whereof I have hereunto set my hand in presence of two subscribing witnesses.

ANDREW RYCKMAN.

Witnesses:
ERNST BUEHLER,
JOSEPH BURKE.